United States Patent [19]
Hammond et al.

[11] Patent Number: 5,815,384
[45] Date of Patent: Sep. 29, 1998

[54] TRANSFORMER WHICH USES BI-DIRECTIONAL SYNCHRONOUS RECTIFICATION TO TRANSFORM THE VOLTAGE OF AN INPUT SIGNAL INTO AN OUTPUT SIGNAL HAVING A DIFFERENT VOLTAGE AND METHOD FOR EFFECTUATING SAME

[75] Inventors: Russell E. Hammond, La Jolla; Leopold J. Johnson, Valley Center, both of Calif.

[73] Assignee: The United States of American as represented by the Secretary of the Navy, Washington, D.C.

[21] Appl. No.: 855,689

[22] Filed: May 14, 1997

[51] Int. Cl.$^6$ ....................................... H02M 3/335
[52] U.S. Cl. .............................. 363/26; 363/127
[58] Field of Search ................... 363/16, 17, 22, 363/24, 25, 26, 98, 131, 132, 125, 127, 133, 84, 88, 89

[56] References Cited

U.S. PATENT DOCUMENTS

| | | |
|---|---|---|
| 2,777,107 | 1/1957 | Medlar . |
| 3,437,909 | 4/1969 | Walker . |
| 3,500,169 | 3/1970 | Ibsen . |
| 3,535,617 | 10/1970 | Landis . |
| 4,109,308 | 8/1978 | Rodel . |
| 4,193,111 | 3/1980 | Wester . |
| 4,399,499 | 8/1983 | Butcher et al. . |
| 4,449,176 | 5/1984 | Turnbull . |
| 4,742,441 | 5/1988 | Akerson . |
| 4,903,189 | 2/1990 | Ngo et al. . |
| 4,953,068 | 8/1990 | Henze . |
| 4,992,921 | 2/1991 | Albach et al. . |
| 5,134,307 | 7/1992 | Nakano . |
| 5,140,509 | 8/1992 | Murugan . |
| 5,155,672 | 10/1992 | Brown ................................. 363/26 X |
| 5,225,971 | 7/1993 | Spreen . |
| 5,255,174 | 10/1993 | Murugan . |
| 5,255,175 | 10/1993 | Uchino . |

*Primary Examiner*—Peter S. Wong
*Assistant Examiner*—Y. J. Han
*Attorney, Agent, or Firm*—Harvey Fendelman; Michael A. Kagan; Peter A. Lipovsky

[57] ABSTRACT

The present invention provides a transformer which uses bi-directional synchronous rectification to transform the voltage of an input signal from one voltage level to another. The invention provides a transformer which requires less core volume, and hence mass, than conventional transformers, and includes a rectifier for transforming a first time varying input signal, such as a sinusoid or saw tooth signal, into a full-wave rectified voltage signal. A synchronous switch control generates first and second control signals in response to sampling the first time varying voltage signal. A floating drive buffer generates third control signals in response to receiving the second control signals. An AC switching stage transforms the full-wave rectified voltage signal into a first and second series of voltage pulses in response to receiving the first control signals. Each of the first and second series of voltage pulses has a pulse period, T, and a pulse width, $\omega$. The first and second series of voltage pulses have amplitudes generally corresponding to the amplitude of the first time varying voltage signal. In response to receiving the second control signals, a bi-directional synchronous rectifier transforms the first and second series of voltage pulses into a third series of voltage pulses having time varying amplitudes generally corresponding to the amplitude of the first time varying voltage signal, a pulse period T/2, and a pulse width, $\omega$. A low pass smoothing filter transforms the third series of voltage pulses into a second time varying analog voltage signal.

22 Claims, 6 Drawing Sheets

TRANSFORMER WHICH USES BI-DIRECTIONAL SYNCHRONOUS RECTIFICATION TO TRANSFORM THE VOLTAGE OF AN INPUT SIGNAL INTO AN OUTPUT SIGNAL HAVING A DIFFERENT VOLTAGE AND METHOD FOR EFFECTUATING SAME

BACKGROUND OF THE INVENTION

The present invention generally relates to the field of transformers, and more particularly, to a transformer which employs bi-directional synchronous rectification to transform a signal from one voltage level to another.

Conventional AC line transformers are used to change AC voltage levels up or down from an AC line value. Such transformers tend to be large and heavy, requiring a considerable amount of iron or silicon steel in their cores. In many transformer applications, such as found in computers or aircraft, size and/or weight constraints are factors which must be overcome to achieve desired power transform performance. One way to reduce the size of a transformer is to use improved core materials having increased magnetic permeability per unit volume. However, a continuing need exists for even smaller transformers than those already employing improved magnetic core materials, yet which still provides comparable performance.

Conventional AC line transformers have an output voltage which is determined by the turns ratio between its secondary and primary windings. Since the turns ratio of the windings is fixed, the ratio of the output voltage to the input voltage is also fixed. However, there are some applications in which it may be desirable for a transformer to provide a variable output voltage. For example, there may be applications where inputs to various electronic devices may be provided by different power sources and/or at different frequencies, but where a constant output is required to be provided to a supply load. In other applications, it may be necessary to step voltages to different levels, depending on system requirements. Thus, a further need exists for a transformer that can provide a controlled output signal having an adjustable amplitude.

SUMMARY OF THE INVENTION

The present invention provides a transformer which uses bi-directional synchronous rectification to transform the voltage of an input signal from one voltage level to another. The invention provides a transformer which requires less core volume, and hence mass, than conventional transformers, and includes a rectifier for transforming a first time varying input signal, such as a sinusoid or saw tooth signal, into a full-wave rectified voltage signal. A synchronous switch control generates first and second control signals in response to sampling the first time varying voltage signal. A floating drive buffer generates third control signals in response to receiving the second control signals. An AC switching stage transforms the full-wave rectified voltage signal into a first and second series of voltage pulses in response to receiving the first control signals. Each of the first and second series of voltage pulses has a pulse period, T, and a pulse width, ω. The first and second series of voltage pulses have amplitudes generally corresponding to the amplitude of the first time varying voltage signal. In response to receiving the second control signals, a bi-directional synchronous rectifier transforms the first and second series of voltage pulses into a third series of voltage pulses having time varying amplitudes generally corresponding to the amplitude of the first time varying voltage signal, a pulse period T/2, and a pulse width, ω. A low pass smoothing filter transforms the third series of voltage pulses into a second time varying analog voltage signal.

The AC switching stage preferably generates pulses at a frequency which may be up to several orders of magnitude higher (100 or 1000 times greater, for example) than the line frequency, typically 60 or 400 Hz and having a duty cycle which may be up to about 98–99% of the pulse period. Since the size of a transformer varies roughly linearly and inversely with frequency, a transformer embodying various features of the present invention may be manufactured to be much smaller than conventional transformers having comparable performance characteristics. For example, if the switching frequency is 10 times higher than the line frequency, the transformer may be 1/10 the size required for a conventional transformer having the same power rating, where size refers to the mass of the transformer core. For 60 Hz systems, the switching frequency can easily be set to 6,000 Hz, allowing reduction in the physical size of the transformer core by a factor of about 100 compared to the core of a conventional transformer.

Another advantage of the invention is that it may be operated to provide a controlled output voltage signal having an adjustable amplitude that is not completely determined by the turns ratio between the primary and secondary windings of the transformer.

These and other advantages of the invention will become more readily apparent upon review of the accompanying specification, including the claims, and drawings.

BRIEF DESCRIPTION OF THE DRAWINGS

Throughout the several views, like elements are referenced using like designations

DESCRIPTION OF THE PREFERRED EMBODIMENT

Figure 1:
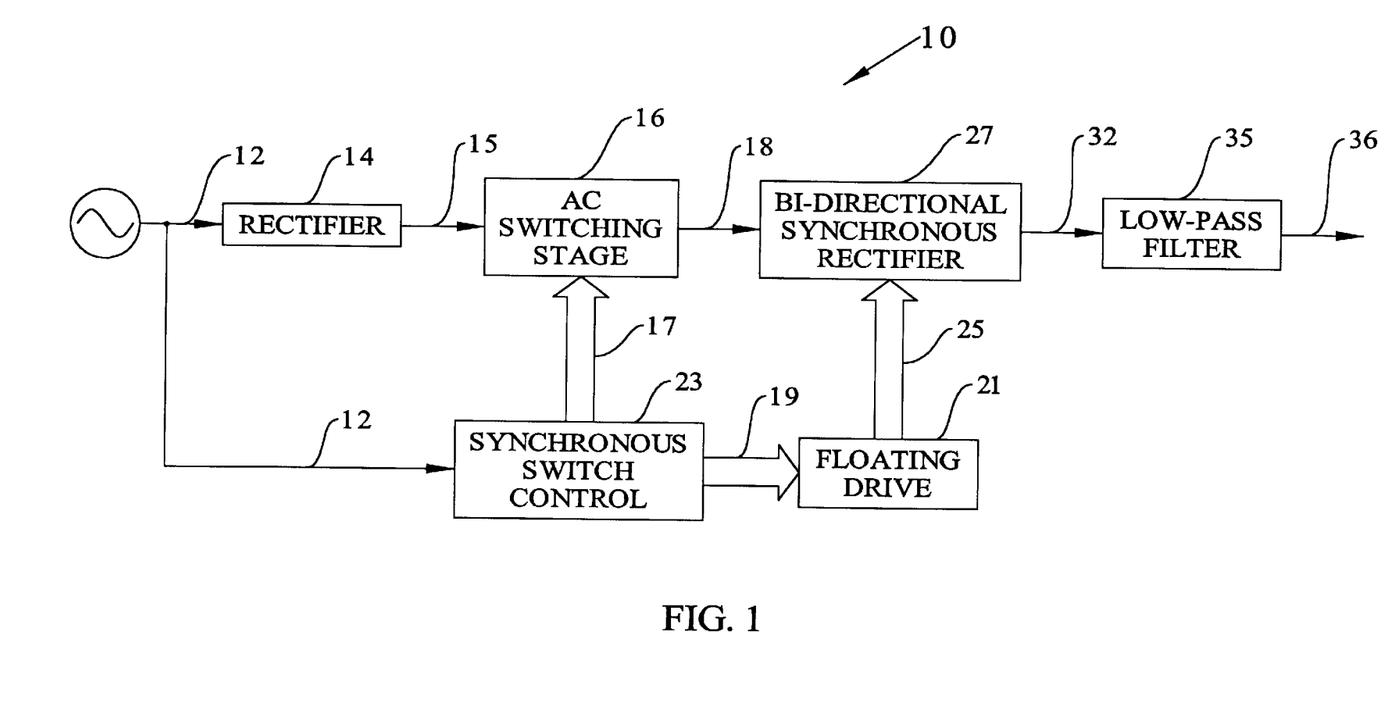
FIG. 1 is a block diagram of a transformer embodying various features of the present invention.
Figure 2:
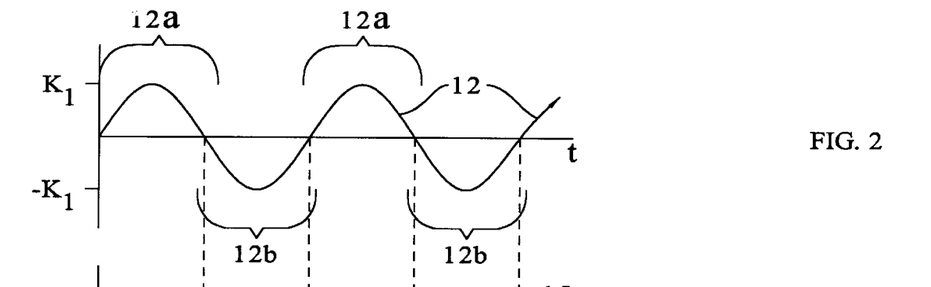
FIG. 2 is graph representing a sinusoidally varying input signal.
Figure 3:
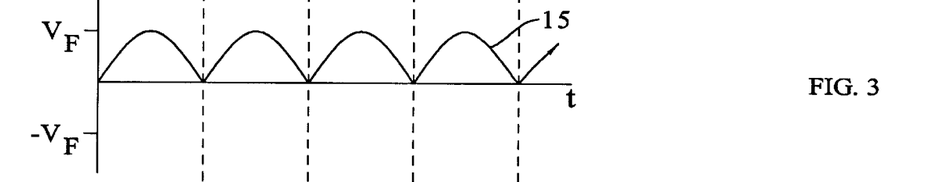
FIG. 3 is a graph representing transformation of the sinusoidally varying input signal into a full wave rectified signal.
Figure 4:
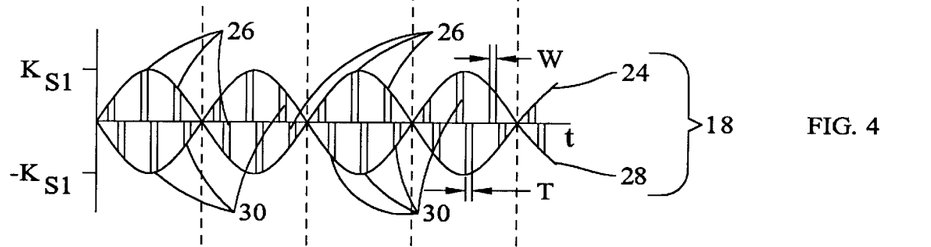
FIG. 4 is a graph representing transformation of the full wave rectified signal into a first and second series of voltage pulses each having a pulse period Γ and a pulse width ω.
Figure 5:
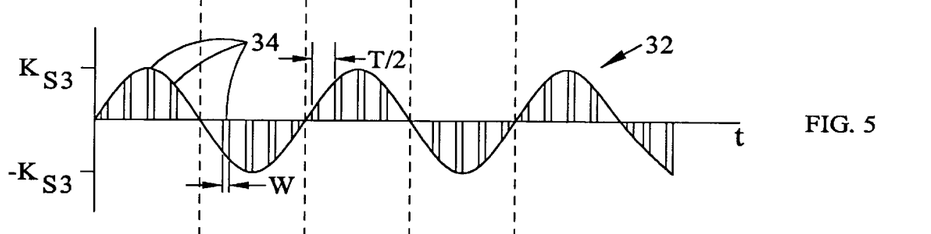
FIG. 5 graphically illustrates transformation of the first and second series of voltage pulses into a third series of voltage pulses having a pulse period Γ/2 and a pulse width ω.
Figure 6:
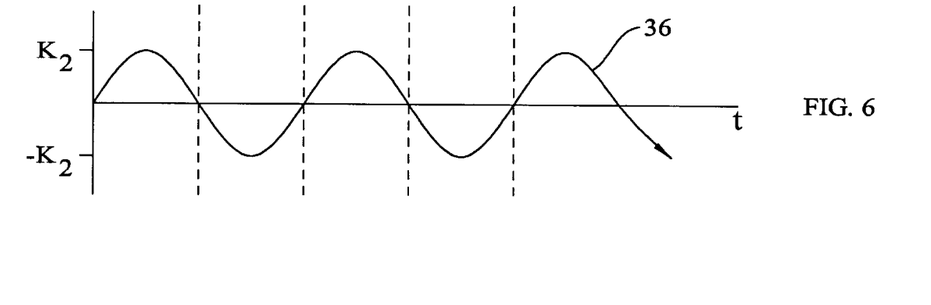
FIG. 6 shows the transformation of the third series of said third voltage pulses into a second sinusoidal voltage signal.

Referring to FIG. 1, there is shown, a high frequency transformer 10 for transforming a voltage signal 12 (FIG. 2)

from a first voltage level, $V_{12}$, to a voltage signal 36 (FIG. 6) having a different voltage level, $V_{36}$. The voltage signal 12 may be a sinusoidal voltage signal characterized by $V_1=k_1\sin(2\pi ft)$, where $V_1$ and f represent the amplitude and frequency, respectively, of voltage signal 12, t represents time, and $k_1$ is a constant. Signal 12 has alternating positive and negative half-cycles 12a and 12b, respectively. Similarly, voltage signal 36 may be characterized by $V_S=k_2\sin(2\pi ft)$, where $V_S$ represents the amplitude of signal 36 and $k_2$ is a constant, where $k_2$ may be less than or greater than $k_1$, depending on the requirements of a particular application. Full wave rectifier 14 transforms voltage signal 12 into a full-wave rectified voltage signal 15 (FIG. 3). Synchronous switch control 23 generates control signals 17 and 19 in response to sampling voltage signal 12. A floating drive buffer 21 generates control signals 25 in response to receiving the second control signals 19. As shown in FIG. 4, AC switching stage 16 transforms full-wave rectified voltage signal 15 into a voltage signal 18 which is provided to bidirectional synchronous rectifier 27 in response to AC switching stage 16 receiving first control signals 17. The voltage signal 18 comprises a first series 24 of positive and negative voltage pulses 26 and a second series 28 of positive and negative voltage pulses 30. The series 24 of voltage pulses 26 and the series 28 of voltage pulses 30 each have a pulse period $\Gamma$ and a pulse width $\omega$. When input voltage signal 12 is a sinusoid, the voltage pulses 26 of the first series 24 have amplitudes approximated by $V_{S1}=k_{S1}\sin(2\pi ft)$, and the voltage pulses 30 of the second series 28 have amplitudes approximated by $V_{S2}=-k_{S1}\sin[2\pi(ft-\epsilon)]$, where $V_{S1}$ and $V_{S2}$ represent the amplitudes of the pulses 26 and 30, respectively, $k_{S1}$ is a constant, and $\epsilon$ represents a phase lag between said first and second series of pulses. Preferably, $\epsilon \cong \Gamma/2$. Bi-directional synchronous rectifier 27 transforms the first series 24 of voltage pulses 26 and the second series 28 of voltage pulses 30 into a third series 32 of voltage pulses 34 in response to receiving the third control signals 25 generated by the floating drive buffer 21. As shown in FIG. 5, the third series 32 of voltage pulses 34 has a pulse period $\Gamma/2$ and a pulse width $\omega$, where the voltage pulses 34 have amplitudes $V_{S3}$ approximated by $V_{S3}=k_{S3}\sin(2\pi ft)$, and $k_{S3}$ is a constant. Low pass filter 35 transforms series 32 of voltage pulses 34 into a generally smoothed sinusoidal voltage signal 36. AC switching stage 16 preferably generates pulses at a frequency which may be up to several orders of magnitude higher (100 to 1000 times greater, for example) than the line frequency, typically 60 or 400 Hz, and having a duty cycle which may be up to about 98–99% of the pulse period.

Figure 7:
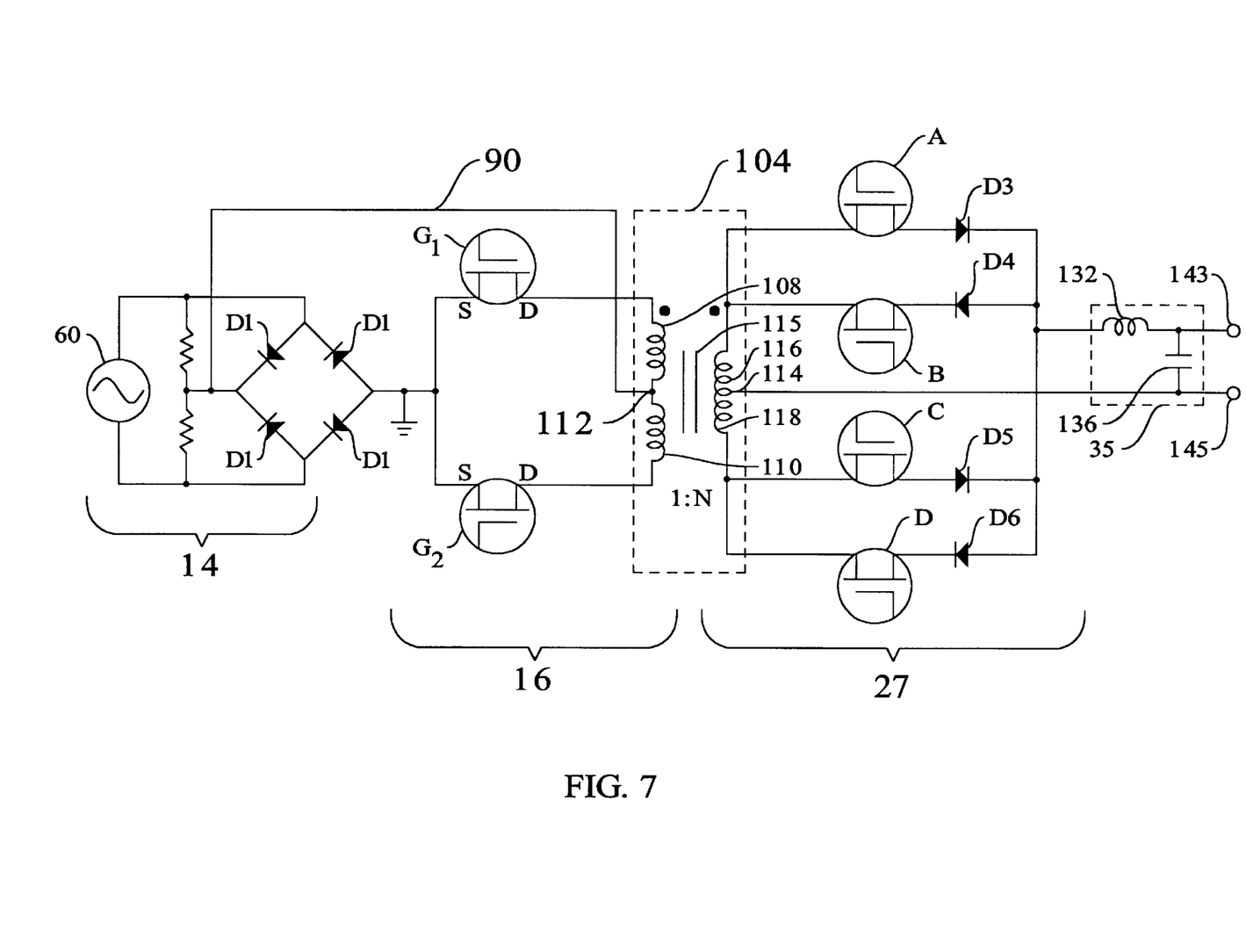
FIG. 7 is a schematic diagram illustrating examples of circuit implementations of the rectifier, AC switching stage, bi-directional synchronous rectifier, and low pass filter of FIG. 1.

The operation of the transformer 10 is described in more detail with reference to FIG. 7 which illustrates examples of circuit implementations of the rectifier 14, AC switching stage 16, bidirectional synchronous rectifier 27, and low pass filter 35. Referring to FIG. 7, voltage signal 12 generated by voltage source 60 is transformed into full wave rectified signal 15 by diodes D1 of rectifier 14. Signal 15 is provided via signal line 90 to center tap 112 between primary windings 108 and 110 of transformer 104. Transformer 104 also includes a core 115 and center tap 114 between secondary windings 116 and 118. The turns ratio of primary windings 108 and 110 to secondary windings 116 and 118 is 1:N, where N represents a positive rational number. The transformer 104 functionally couples the AC switching stage 16 to the bi-directional rectifier 27. Primary windings 108 and 110 may be considered part of AC switching stage 16 and secondary windings 116 and 118 may be considered as part of bi-directional rectifier 27. The filter 35 includes inductor 129 and capacitor 131, as shown. In the operation of transformer 10, four cases with respect to the operation of the synchronous rectifier are considered and described with reference to FIG. 7.

In case 1, voltage signal 12 (FIG. 2) and pulses 26 of pulse series 24 (FIG. 4) are positive. Referring to FIG. 7, full wave rectified signal 15 is provided via conductor line 90 to center tap 112 between primary windings 108 and 110 of transformer 104. Signal 15 then feeds through center tap 112, primary winding 110, and switch G2. In such case, voltage signal 18 induced in secondary winding 116 feeds through switch A and diode D3 to provide a positive pulse 34 which is filtered by low pass filter 35 to provide smoothed signal 36 having a positive value across output terminals 143 and 145.

In case 2, voltage signal 12 (FIG. 2) is positive while pulses 30 of pulse series 28 (FIG. 4) are negative. From center tap 112, signal 15 is directed through primary winding 108, and switch G1. In such case, voltage signal 18, induced in secondary winding 116, feeds through switch C and diode D5 to provide a positive pulse 34 which is filtered to provide smoothed signal 36 having a positive value by low pass filter 35 across output terminals 143 and 145.

In case 3, voltage signal 12 (FIG. 2) is negative while pulses 26 of pulse series 26 (FIG. 4) are positive. Signal 15 feeds through center tap 112, primary winding 108, and switch G1. Voltage signal 18 then is induced in secondary winding 118 and feeds through switch B and diode D4 to provide a negative pulse 34 which is filtered by low pass filter 35 to provide smoothed signal 36 having a negative value.

In case 4, voltage signal 12 (FIG. 2) and pulses 30 of pulse series 28 (FIG. 4) are negative. Full wave rectified signal 15 is provided from center tap 112 to primary winding 110, and switch G2. In such case, voltage signal 18 induced in secondary winding 118 feeds through switch D, and diode D6 to provide a negative pulse 34 which is filtered by low pass filter 35 to provide smoothed signal 36 having a negative value.

Figure 8:
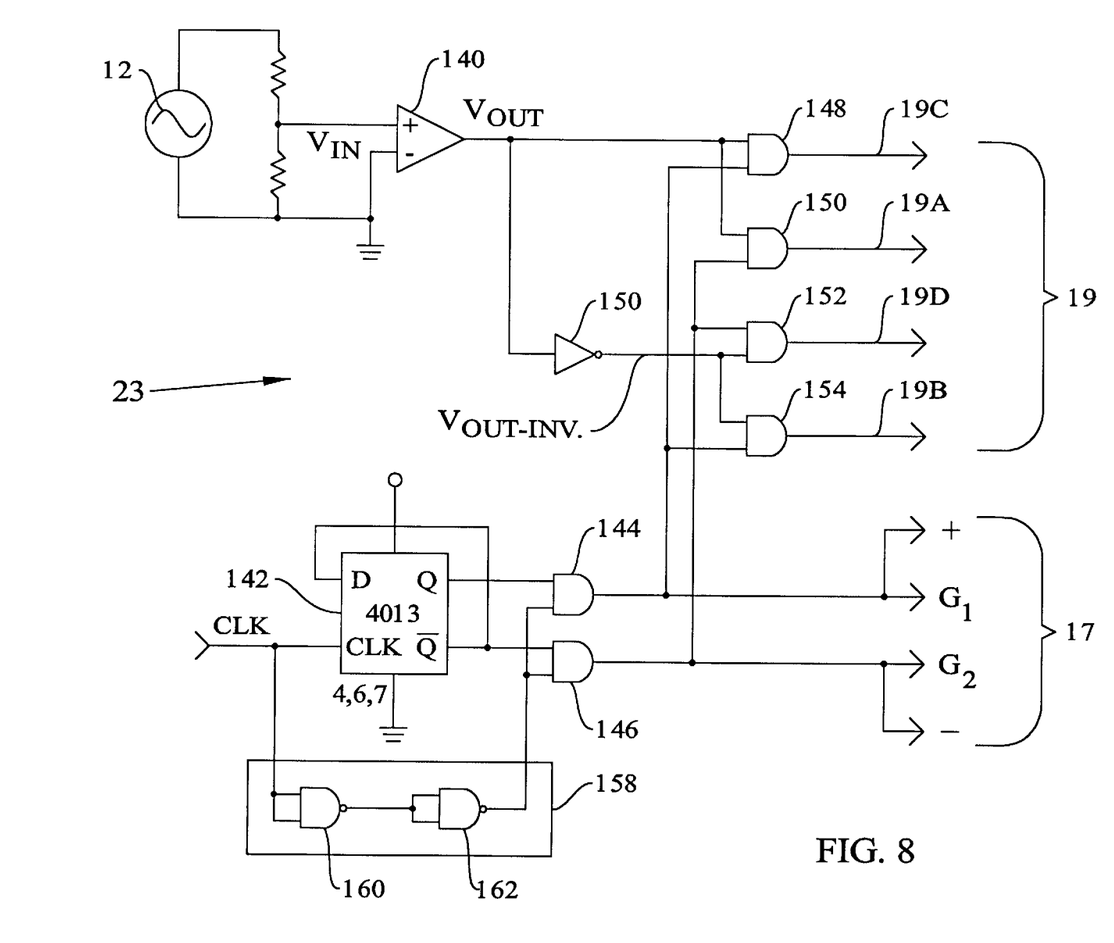
FIG. 8 is an example of the synchronous switch control of FIG. 1.

Synchronous switch control 23 shown in FIG. 1 controls the timing of switches G1, G2, A, B, C, and D and is described with reference to FIG. 8. By way of example, switches G1, G2, A, B, C, and D may be implemented as MOSFETs, which are either ON, represented by a logic value of "1," or OFF, represented by a logic "0." However, the switches A, B, C, and D may also, for example, be implemented as bipolar transistors. In such case, the diodes D3–D6 shown in FIG. 7 would not be required. A truth table illustrating The operational logic of switches G1, G2, A, B, C, and D is described below with reference to TABLE 1 and TABLE 2, below. Synchronous switch control 23 includes a comparator 140 for detecting the polarity of signal 12, a flip-flop 142, AND gates 144, 146, 148, 150, 152, and 154, inverter 156, and delay 158, comprised by way of example, of NAND gates 160 and 162 connected in series as shown. The output of comparator 140, $V_{OUT}$ is a logic high ("1") when the polarity of voltage signal 12, $V_{12}$, is positive, and is a logic low ("0") when the $V_{12}$ is negative, as summarized in TABLE 2. $V_{OUT}$ is provided to AND gates 148, 150, and inverter 156. Clock signal CLK is provided to flip-flop 142 having Q and $\overline{Q}$ outputs. The Q and $\overline{Q}$ outputs are provided to AND gates 144 and 146, respectively. Clock signal CLK is also directed through delay 158 to the other inputs of the AND gates 144 and 146 so that the flip-flop 142, delay 158 and AND gates 144 together provide a pulse drive system for alternately generating logic HIGH ("1") and LO ("0")

signals 17 which are provided to switches G1 and G2, respectively, in a push-pull, i.e., staggered manner.

The output of AND gate 144 is further provided as an input to AND gates 148 and 154. AND gates 148 and 150 receive $V_{OUT}$ from comparator 140. Inverter 156 and AND gates 148 and 150 receive $V_{OUT}$ from comparator 140. The output of AND gate 146 is further directed to AND gates 150 and 152. Inverter 156 inverts $V_{OUT}$ to provide signal $V_{OUT\text{-}INV}$, to AND gates 152 and 154. Thus, it may be appreciated that synchronous switch control 23 operates so that normally open switches A, B, C, and D are briefly closed and then opened one at a time in a repeating sequence which is timed to the push-pull (staggered) switching of switches G1 and G2 in accordance with the logic presented in TABLE 1. The outputs of AND gates 148, 150, 152, and 154 are provided as signals 19c, 19a, 19d, and 19b respectively, which collectively comprise signal 19.

TABLE 1

| Case No. | $V_{OUT}$ | G1 | G2 | A | B | C | D |
|---|---|---|---|---|---|---|---|
| 1 | 1 | 0 | 1 | 1 | 0 | 0 | 0 |
| 2 | 1 | 1 | 0 | 0 | 0 | 1 | 0 |
| 3 | 0 | 1 | 0 | 0 | 1 | 0 | 0 |
| 4 | 0 | 0 | 1 | 0 | 0 | 0 | 1 |

Preferably, pulses 26 of pulse series 24, and pulses 30 of pulse series 28 have a pulse width, ω, and a pulse period T. Pulses 34 of pulse series 32 have a pulse width ω, but generally have a pulse period generally of about T/2.

TABLE 2

| $V_{12}$ | $V_{OUT}$ |
|---|---|
| Positive | 1 |
| Negative | 0 |

Figure 9:
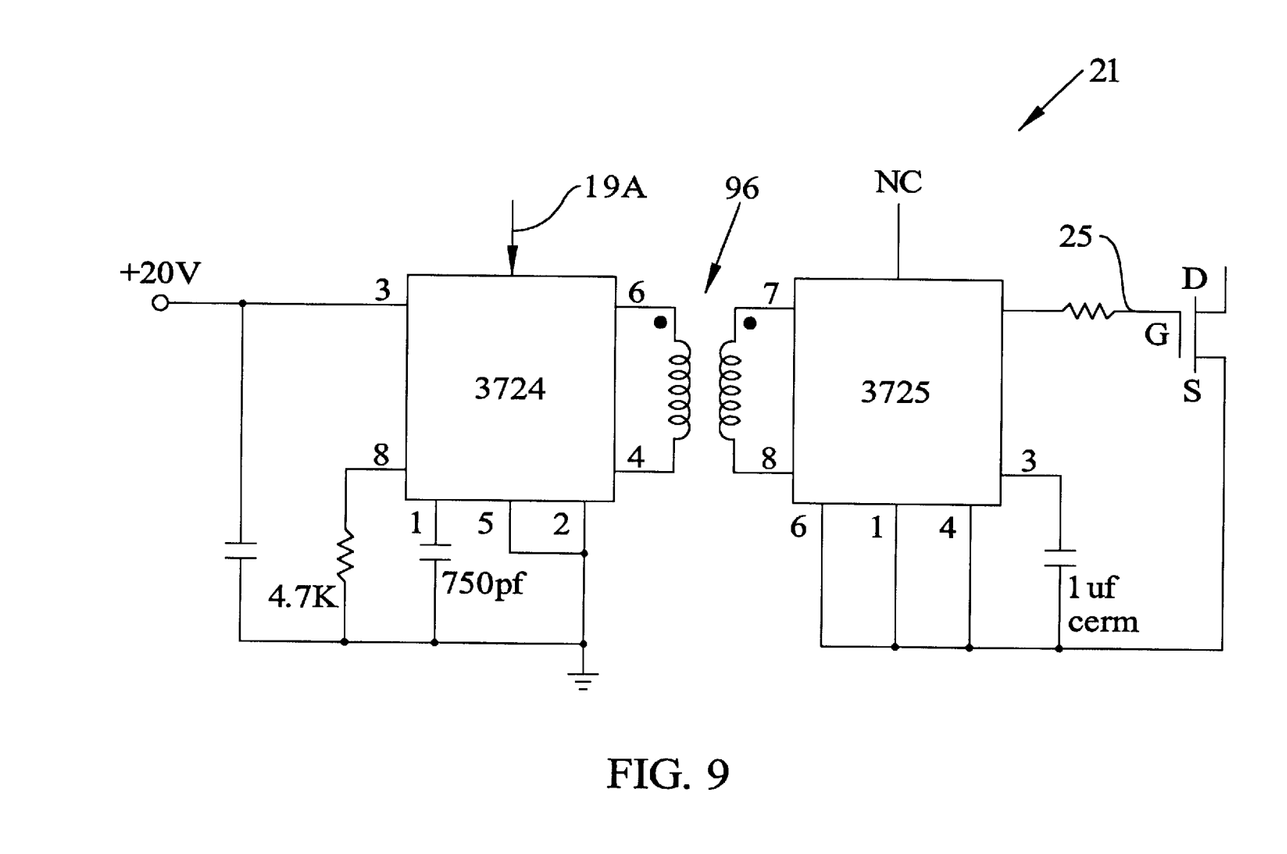
FIG. 9 represents an example of the floating gate buffer of FIG. 1.

An example of floating drive 21 is shown by way of example in FIG. 9 to include integrated circuit chips 3724 and 3725 coupled by transformer 96. The purpose of the floating drive is to assure that the gate voltage of transistor switches A, B, C, and D are established at a predetermined level above the source voltage, which may vary. In FIG. 9, floating gate 21 is shown, by way of example, to functionally couple signal 19a to switch A. However, it is to be understood that a floating gate 21 is used to couple each of signals 19b, 19c, and 19d to switches B, C, and D, respectively.

Suitable control of the frequency and/or pulse width of CLK signal (FIG. 8) may be employed to modulate the voltage level of the output signal 36 provided by low-pass filter 35 to a desired level. The voltage level of signal 36 may such that the ratio $V_{36}/V_{12}$ is not necessarily equal to the ratio N:1, representing the turns ratio between the secondary windings 116 and 118, and primary windings 108 and 112, where $V_{36}$ and $V_{12}$ represent the voltage levels of output signal 36 and input signal 12, respectively.

Figure 10:
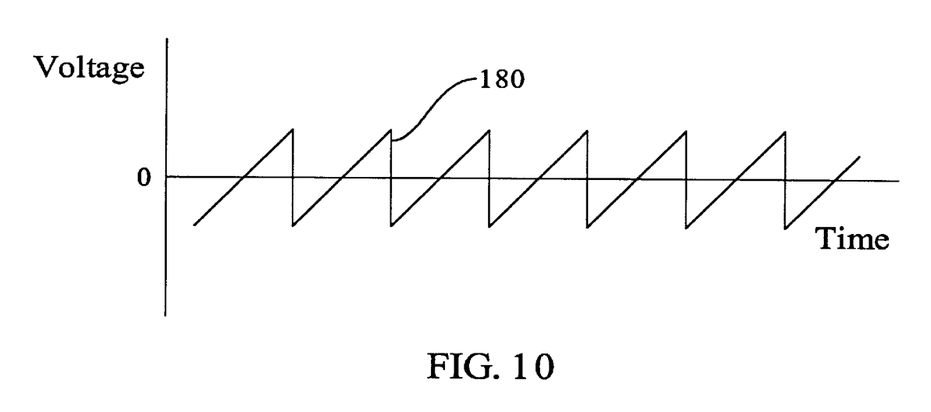
FIG. 10 represents a saw tooth waveform.

Obviously, many modifications and variations of the present invention are possible in light of the above teachings. For example, while the invention for purposes of illustration has been described with reference to sinusoidal input voltage signals, it is to be understood that the scope of the invention includes its use in conjunction with other time varying voltage signals input signals which may have, for example, saw tooth and other time varying waveforms, such as saw tooth signal 180, shown in FIG. 10. Therefore, it is to be understood that within the scope of the appended claims, the invention may be practiced otherwise than as specifically described.

We claim:

1. A method for transforming a voltage signal from a first voltage level to a second voltage level, comprising the steps of:

a) transforming a first time varying voltage signal into a full-wave rectified voltage signal;

b) transforming said full-wave rectified voltage signal into a first series of voltage pulses having amplitudes bounded by a first time varying function comprising alternating first positive and first negative half-cycles, and into a second series of voltage pulses having amplitudes bounded by a second time varying function comprising alternating second positive and second negative half-cycles, where said second time varying function is approximately 180 degrees out of phase with respect to said first time varying function;

c) transforming said first and second series of voltage pulses into a third series of voltage pulses having amplitudes bounded by a third time varying function comprising alternating third positive and third negative half-cycles, where said third positive half-cycle includes positive voltage pulses and said negative half-cycle includes negative voltage pulses; and d) transforming said third series of said third voltage pulses into a second time varying voltage signal having an amplitude generally defined by said third time varying function.

2. The method of claim 1 wherein said first and second time varying voltage signals each are periodic time varying voltage signals.

3. The method of claim 1 wherein said first time varying voltage signal is a sinusoid.

4. The method of claim 3 wherein said second time varying signal is a sinusoid.

5. The method of claim 1 wherein said first time varying voltage signal has a saw tooth waveform.

6. The method of claim 5 wherein said second time varying voltage signal has a saw tooth waveform.

7. A method for transforming a voltage signal from a first voltage level to a second voltage level, comprising the steps of:

a) transforming a first sinusoidal voltage signal into a full-wave rectified voltage signal, where said first sinusoidal voltage signal is characterized by $V_1 = k_1 \sin(2\pi ft)$, $V_1$ and f represent the amplitude and frequency of said first voltage signal, respectively, t represents time, and $k_1$ is a constant;

b) transforming said full-wave rectified voltage signal into a first and second series of voltage pulses each having a pulse period Γ and a pulse width ω, said voltage pulses of said first series having amplitudes approximated by $V_{S1} = k_{S1} \sin(2\pi ft)$, and said voltage pulses of said second series having amplitudes approximated by $V_{S2} = -k_{S1} \sin[2\pi(ft-\epsilon)]$, where $V_{S1}$ and $V_{S2}$ represent the amplitudes of said pulses of said first and second series, respectively, ε represents a phase lag between said first and second series of pulses, and $k_{S1}$ is a constant;

c) transforming said first and second series of voltage pulses into a third series of voltage pulses having a pulse period Γ/2 and a pulse width ω, where said voltage pulses of said third series of voltage pulses have amplitudes $V_{S3}$ approximated by $V_{S3} = k_{S3} \sin(2\pi ft)$, and $k_{S3}$ is a constant, and where said third series of voltage pulses comprise alternating positive and negative half-cycles, where said positive half-cycle includes positive voltage pulses and said negative half-cycle includes negative voltage pulses; and d) transforming said third series of said third voltage pulses into a second sinusoidal voltage signal having an amplitude $V_2$, where $V_S = k_2 \sin(2\pi ft)$, and $k_2$ is a constant.

8. The method of claim 7 wherein step (b), $\epsilon \cong \Gamma/2$.

9. A transformer for transforming a voltage signal from a first voltage level to a second voltage level, comprising:

a rectifier for transforming a first time varying voltage signal into a full-wave rectified voltage signal;

a synchronous switch control for generating first and second control signals in response to sampling said first voltage signal;

a floating drive buffer which generates third control signals in response to receiving said second control signals;

an AC switching stage where in response to receiving said first control signals, transforms said full-wave rectified voltage signal into a first series of voltage pulses having amplitudes defined by a first time varying function and a second series of voltage pulses having amplitudes defined by a second time varying function, where said second time varying function is approximately 180 degrees out of phase with respect to said first time varying function;

a bi-directional synchronous rectifier for transforming said first and second series of voltage pulses into a third series of voltage pulses in response to receiving said third control signals, where said third series of voltage pulses has amplitudes defined by a third time varying function having alternate positive and negative half-cycles, where said positive half-cycles include positive voltage pulses and said negative half-cycles include negative voltage pulses; and a filter for transforming said third series of said third voltage pulses into a second time varying voltage signal.

10. The transformer of claim 9 wherein said first time varying voltage signal is a sinusoid having an amplitude $V_1$ characterized by $V_1 = k_1 \sin(2\pi ft)$, where f represents the frequency of said first time varying voltage signal, t represents time, and $k_1$ is a constant.

11. The transformer of claim 10 wherein each of said first and second series of voltage pulses have a pulse period $\Gamma$ and a pulse width $\omega$, said voltage pulses of said first series having amplitudes $V_{S1}$ approximated by $V_{S1} = k_{S1} \sin(2\pi ft)$, and said voltage pulses of said second series having amplitudes approximated by $V_{S2} = -k_{S1} \sin[2\pi(ft-\epsilon)]$, where $V_{S1}$ and $V_{S2}$ represent the amplitudes of said pulses of said first and second series, respectively, $\epsilon$ represents a phase lag between said first and second series of pulses, and $k_{S1}$ is a constant.

12. The transformer of claim 10 wherein said third series of voltage pulses have a pulse period $\Gamma/2$ and a pulse width $\omega$, and said voltage pulses of said third series of voltage pulses have amplitudes $V_{S3}$ approximated by $V_{S3} = k_{S3} \sin(2\pi ft)$, and $k_{S3}$ is a constant.

13. The transformer of claim 10 wherein second time varying voltage signal has an amplitude $V_2$, where $V_S = k_2 \sin(2\pi ft)$, and $k_2$ is a constant.

14. The transformer of claim 11 wherein $\epsilon = \Gamma/2$.

15. The transformer of claim 9 further including:

a center tap transformer for coupling said AC switching stage to said bi-directional synchronous rectifier, said center tap transformer having first and second primary windings, and first and second secondary windings; where said AC switching stage includes a first switch for conducting said rectified voltage signal through said first primary winding, and a second switch for conducting said rectified voltage signal through said second primary winding; and said synchronous switch control alternately switches said first and second switches.

16. The transformer of claim 15 wherein said first and second switches are solid state devices.

17. The transformer of claim 16 wherein said solid state devices are transistors.

18. The transformer of claim 15 wherein said bi-directional synchronous rectifier includes third and fourth switches for establishing electrical conductivity through said first secondary winding, and fifth and sixth switches for establishing electrical conductivity with said second secondary winding.

19. The transformer of claim 18 wherein said synchronous switch control generates control signals for periodically switching one of said third, fourth, fifth, and sixth switches at a time.

20. The transformer of claim 15 wherein said synchronous switch control includes:

a comparator for generating a logic signal, $V_{OUT}$, having a first logic level when said first time varying voltage signal has a first polarity and a second logic level when said first time varying voltage signal has a second polarity, and where said synchronous switch control:

a) enables said third switch when $V_{OUT}$ has a first logic level and said second switch is enabled;

b) enables said fifth switch when $V_{OUT}$ has said first logic level and said first switch is enabled;

c) enables said fourth switch when $V_{OUT}$ has a second logic level and said first switch is enabled; and d) enables said sixth switch when $V_{OUT}$ has said second logic level and said second switch is enabled.

21. The transformer of claim 15 wherein said AC switching stage receives clock pulses at a pulse frequency which is modulated.

22. The transformer of claim 15 wherein said AC switching stage receives clock pulses having a duty cycle which is modulated.

* * * * *